「12」 United States Patent
Viola

US011157912B2

(10) Patent No.: US 11,157,912 B2
(45) Date of Patent: Oct. 26, 2021

(54) METHOD AND SYSTEM FOR ENHANCING THE SECURITY OF A TRANSACTION

(71) Applicant: GEMALTO SA, Meudon (FR)

(72) Inventor: Francesco Viola, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 254 days.

(21) Appl. No.: 16/065,793

(22) PCT Filed: Dec. 21, 2016

(86) PCT No.: PCT/EP2016/082215
§ 371 (c)(1),
(2) Date: Jun. 23, 2018

(87) PCT Pub. No.: WO2017/108977
PCT Pub. Date: Jun. 29, 2017

(65) Prior Publication Data
US 2019/0012672 A1    Jan. 10, 2019

(30) Foreign Application Priority Data
Dec. 24, 2015  (EP) .................................... 15307141

(51) Int. Cl.
*G06F 21/60* (2013.01)
*G06Q 20/40* (2012.01)
(Continued)

(52) U.S. Cl.
CPC ....... *G06Q 20/4016* (2013.01); *G06F 21/125* (2013.01); *G06F 21/44* (2013.01);
(Continued)

(58) Field of Classification Search
CPC .. G06Q 20/3278; G06Q 20/341; G06Q 20/20; G06Q 20/32; G06Q 20/352;
(Continued)

(56) References Cited

U.S. PATENT DOCUMENTS 4,268,715 A * 5/1981 Atalla .................. G06Q 20/401
                                                                235/379
5,008,936 A * 4/1991 Hamilton .............. G06F 21/602
                                                                380/281
(Continued)

FOREIGN PATENT DOCUMENTS

EP     1672554 A1     6/2006
EP     2151795 A1     2/2010
(Continued)

OTHER PUBLICATIONS

Clarksville Rd: "Smart Card Alliance A Smart Card Alliance Mobile & NFC Council White Paper", Aug. 1, 2014, XP055171894, Retrieved from the internet: URL:http://www.smartcardalliance.org/wp-content/uploads/HCE-101-WP-FINAL-081114-clean.pdf [retrieved on Feb. 25, 2015] pp. 12-15, p. 19.
(Continued)

*Primary Examiner* — Scott S Trotter
(74) *Attorney, Agent, or Firm* — The Jansson Firm; Pehr B. Jansson

(57) ABSTRACT

This invention concerns a method and system for improving the security of transaction in an emulated Integrated Circuit. During compilation time of a payment application, at least one detection agent are inserted into the code of the payment application. This detection agent is configured to detect an unauthorized use of the payment application. During a runtime of the payment application, if the detection agent result indicates "no threat detected" the payment application retrieves from a predefined map of "no threat detected", the right value associated to the detection agent, otherwise a random false value is generated. The payment application alters at least one data manipulated during the transaction with the value retrieved or generated. A reverse mechanism of the payment application retrieve the right value and apply a restoration process to the altered data with the retrieved (Continued)

right value. The payment application computes a cryptogram from the restored manipulated data. From the computed cryptogram, a third party can authorize or reject the transaction.

12 Claims, 5 Drawing Sheets

(51) Int. Cl.

| | | |
|---|---|---|
| *G06Q 20/34* | (2012.01) | |
| *G06Q 20/38* | (2012.01) | |
| *H04L 29/06* | (2006.01) | |
| *G06F 21/12* | (2013.01) | |
| *G06Q 20/32* | (2012.01) | |
| *G06F 21/44* | (2013.01) | |
| *G06F 21/57* | (2013.01) | |

(52) U.S. Cl.
CPC ............ *G06F 21/57* (2013.01); *G06F 21/577* (2013.01); *G06F 21/602* (2013.01); *G06Q 20/32* (2013.01); *G06Q 20/34* (2013.01); *G06Q 20/382* (2013.01); *G06Q 20/3825* (2013.01); *G06Q 20/3827* (2013.01); *H04L 63/00* (2013.01); *H04L 63/123* (2013.01); *G06F 2221/033* (2013.01)

(58) Field of Classification Search
CPC ........... G06Q 20/3552; G06Q 20/3574; G06Q 20/3823; G06Q 20/3825; G06Q 20/3829; G06Q 20/385; G06Q 20/202; G06Q 20/227; G06Q 20/322; G06Q 20/3563; G06Q 20/357; G06Q 20/382; G06Q 20/401; G06Q 20/4033; G06Q 20/4037; G06Q 2220/00; G06Q 20/1085; G06Q 20/12; G06Q 20/204; G06Q 20/206; G06Q 20/3227; G06Q 20/327; G06Q 20/34; G06Q 20/354; G06Q 20/3558; G06Q 20/3572; G06Q 20/36; G06Q 20/3672; G06Q 20/3674; G06Q 20/38215; G06Q 20/3827; G06Q 20/40145; G06Q 20/406; G06Q 20/409; G07F 7/0853; G07F 7/10; G07F 7/127; G07F 7/0846; G06F 21/44; G06F 21/602; G06F 16/2365; G06F 21/125; G06F 21/14; G06F 21/316; G06F 21/57; G06F 21/577; G06F 21/606; G06F 21/64; G06F 21/77; G06F 2221/033; G06F 9/455; H04W 12/04; H04W 88/02; H04W 12/0401; H04W 12/04031; H04W 12/0608; H04W 4/80; G01R 31/3648; G01R 31/382; G06K 9/00087; G06K 9/00288; G06K 9/00617; H04L 2463/062; H04L 63/00; H04L 63/068; H04L 63/123; H04L 9/0822; H04L 9/088; H04L 9/3268; H04L 9/3278

See application file for complete search history.

(56) References Cited

U.S. PATENT DOCUMENTS

| | | | | |
|---|---|---|---|---|
| 5,128,996 | A * | 7/1992 | Rosenow | G07F 7/1016 235/380 |
| 5,175,766 | A * | 12/1992 | Hamilton | G06F 21/6245 705/64 |
| 5,892,900 | A * | 4/1999 | Ginter | G06F 21/10 726/26 |
| 6,006,328 | A * | 12/1999 | Drake | G06F 21/14 713/188 |
| 6,535,997 | B1 * | 3/2003 | Janson | G06Q 40/02 235/380 |
| 7,181,017 | B1 * | 2/2007 | Nagel | H04L 9/0825 380/282 |
| RE46,513 | E * | 8/2017 | Bisbee | F23H 17/12 |
| 9,767,422 | B2 * | 9/2017 | Ray | G07F 19/2055 |
| 9,928,379 | B1 * | 3/2018 | Hoffer | G16H 50/70 |
| 2002/0010684 | A1 * | 1/2002 | Moskowitz | G06Q 20/085 705/75 |
| 2002/0161826 | A1 * | 10/2002 | Arteaga | G06F 16/9574 709/203 |
| 2002/0166060 | A1 * | 11/2002 | Hsieh | G07F 7/10 726/20 |
| 2002/0184217 | A1 * | 12/2002 | Bisbee | H04L 63/123 |
| 2003/0065921 | A1 * | 4/2003 | Chang | G06F 21/6209 713/175 |
| 2004/0078569 | A1 * | 4/2004 | Hotti | G06F 21/6227 713/165 |
| 2004/0117262 | A1 * | 6/2004 | Berger | G07F 7/0886 705/16 |
| 2005/0091524 | A1 * | 4/2005 | Abe | G06Q 20/341 726/26 |
| 2005/0183072 | A1 * | 8/2005 | Horning | G06F 21/125 717/140 |
| 2006/0080537 | A1 | 4/2006 | Yoshizaki | |
| 2006/0095369 | A1 * | 5/2006 | Hofi | G06Q 20/10 705/39 |
| 2006/0137016 | A1 * | 6/2006 | Margalit | G06F 21/14 726/26 |
| 2006/0173951 | A1 * | 8/2006 | Arteaga | H04L 67/02 709/203 |
| 2006/0273151 | A1 * | 12/2006 | Block | G07F 19/209 235/379 |
| 2007/0250317 | A1 * | 10/2007 | Davis | G10L 15/26 704/235 |
| 2007/0276765 | A1 * | 11/2007 | Hazel | G06K 7/082 705/71 |
| 2008/0086613 | A1 * | 4/2008 | Mosek | G06F 21/6218 711/163 |
| 2008/0091944 | A1 * | 4/2008 | Mueller | G06F 21/606 713/168 |
| 2009/0006262 | A1 * | 1/2009 | Brown | G06Q 20/4016 705/64 |
| 2009/0048953 | A1 * | 2/2009 | Hazel | G07F 7/1008 705/35 |
| 2009/0060199 | A1 * | 3/2009 | von Mueller | G06F 21/606 380/278 |
| 2009/0083372 | A1 * | 3/2009 | Teppler | H04L 9/3226 709/203 |
| 2010/0036777 | A1 * | 2/2010 | Korosec | G06Q 20/12 705/408 |
| 2010/0198728 | A1 * | 8/2010 | Aabye | G06Q 20/401 705/44 |
| 2010/0211504 | A1 * | 8/2010 | Aabye | G06Q 20/10 705/44 |
| 2010/0217709 | A1 * | 8/2010 | Aabye | G06Q 20/322 705/44 |
| 2010/0268696 | A1 * | 10/2010 | Nightengale | G06F 16/24573 707/694 |
| 2011/0060913 | A1 * | 3/2011 | Hird | G06F 21/34 713/184 |
| 2011/0113237 | A1 * | 5/2011 | Hird | H04L 9/0863 713/155 |
| 2011/0191244 | A1 * | 8/2011 | Dai | H04W 4/80 705/44 |
| 2011/0196796 | A1 * | 8/2011 | Florek | G06Q 20/382 705/64 |
| 2011/0307382 | A1 * | 12/2011 | Siegel | G06Q 20/4016 705/44 |
| 2012/0039469 | A1 * | 2/2012 | Mueller | G06Q 20/12 380/252 |
| 2012/0069991 | A1 * | 3/2012 | Junod | G06F 21/445 380/2 |

(56) References Cited

U.S. PATENT DOCUMENTS

| | | | | |
|---|---|---|---|---|
| 2012/0317035 | A1* | 12/2012 | Royyuru | G06Q 30/06 705/71 |
| 2013/0054474 | A1* | 2/2013 | Yeager | G06Q 20/02 705/71 |
| 2013/0145455 | A1* | 6/2013 | Vijayshankar | G06F 21/78 726/16 |
| 2013/0173456 | A1* | 7/2013 | Grigg | G06Q 20/3221 705/39 |
| 2013/0185167 | A1* | 7/2013 | Mestre | G06Q 20/202 705/21 |
| 2014/0040146 | A1* | 2/2014 | Fiske | G06Q 20/3825 705/67 |
| 2014/0040149 | A1* | 2/2014 | Fiske | G06Q 20/3278 705/71 |
| 2014/0214668 | A1* | 7/2014 | Lotter | H04L 63/1425 705/41 |
| 2014/0282858 | A1* | 9/2014 | Moskowitz | H04N 21/4181 726/1 |
| 2014/0364058 | A1* | 12/2014 | Chew | G06F 21/34 455/41.1 |
| 2015/0178724 | A1* | 6/2015 | Ngo | G06Q 20/322 705/71 |
| 2015/0339664 | A1* | 11/2015 | Wong | H04L 9/3263 705/71 |
| 2015/0363771 | A1* | 12/2015 | Graylin | G06Q 20/12 705/65 |
| 2016/0057619 | A1* | 2/2016 | Lopez | G06Q 20/385 380/247 |
| 2016/0092872 | A1* | 3/2016 | Prakash | G06Q 20/3265 705/65 |
| 2016/0182543 | A1* | 6/2016 | Aabye | H04L 63/1416 726/5 |
| 2016/0217467 | A1* | 7/2016 | Smets | G06Q 20/3227 |
| 2016/0239836 | A1* | 8/2016 | Mueller | G06Q 20/204 |
| 2017/0063975 | A1* | 3/2017 | Prakash | G06F 21/44 |
| 2017/0357960 | A1* | 12/2017 | Quentin | H04L 63/10 |
| 2017/0364913 | A1* | 12/2017 | Aabye | G06Q 40/12 |
| 2018/0039987 | A1* | 2/2018 | Molino | G06Q 20/34 |
| 2018/0240102 | A1* | 8/2018 | Finkenzeller | G06Q 20/3278 |
| 2018/0253541 | A1* | 9/2018 | Finkenzeller | H04L 9/32 |
| 2018/0349913 | A1* | 12/2018 | Yeager | G06Q 20/02 |
| 2019/0087814 | A1* | 3/2019 | Eric | H04L 63/0428 |
| 2019/0333139 | A1* | 10/2019 | Royyuru | G06Q 20/04 |

FOREIGN PATENT DOCUMENTS

| | | |
|---|---|---|
| WO | WO9704394 A1 | 2/1997 |
| WO | WO2015042548 A1 | 3/2015 |
| WO | WO2015179637 A1 | 11/2015 |

OTHER PUBLICATIONS

PCT/EP2016/082215, International Search Report, dated Feb. 7, 2017, European Patent Office, P.B. 5818 Patentlaan 2 NL—2280 HV Rijswijk.

PCT/EP2016/082215, Written Opinion of the International Searching Authority, dated Feb. 7, 2017, European Patent Office, D-80298 Munich.

PCT/EP2016/082208, International Search Report, dated Feb. 21, 2017, European Patent Office, P.B. 5818 Patentlaan 2 NL—2280 HV Rijswijk.

PCT/2016/082209, International Search Report, dated Feb. 28, 2017, European Patent Office, P.B. 5818 Patentlaan 2 NL—2280 HV Rijswijk.

\* cited by examiner

METHOD AND SYSTEM FOR ENHANCING THE SECURITY OF A TRANSACTION

TECHNICAL FIELD

The present invention relates generally to the field of payment and authorization methods. More particularly this disclosure relates to using a computing device that does not have or does not rely on a secure element to make payments, authorizations or exchange information with other devices.

Particularly, the present invention relates to a method and system for improving the security of transaction in an emulated Integrated Circuit (ICC).

BACKGROUND ART

Advances in the capabilities of communication devices have allowed portable communication devices such as smart phones to be used as payment instruments to conduct contactless transactions. For example, a portable communication device can be placed in proximity to an access device such as a point-of-sale (POS) terminal to transfer account information from the portable communication device to the access device to conduct a transaction.

To provide a secure operating environment to securely store account information on a portable communication device, secure elements such as SIM cards, micro-SD cards or mobile phone embedded chips has been looked during quite a long time as the right place to securely store the most sensitive part of mobile applications of the service providers.

Indeed, the secure element is considered secure because account information, keys and secret data are stored in tamper-resistant hardware, which protects these information from malware or viruses that may have infected the operating system or an application running on the portable communication device.

Today, new emerging technologies are coming up, some of them relying on a new security paradigms, different than traditional secure storage. In current state of the art technology it is possible to "emulate" a smart card by software and to use it in the context of contactless transactions, using the so called "Host Card Emulation" (HCE) technology. It is possible to perform NFC payments by using such a software smart card emulation into a communication device.

However, because a secure element is not used, transaction security is a real concern. Indeed, the keys and sensitive data are stored on the communication device. While a secure element is practically inaccessible, the communication devices defenses can be easily defeated and can allow a malicious individual to access a specific application to understand how it works and so gather possibly the way to steal keys and sensitive data.

Moreover, as the incentive for an attacker to profit from the stored data is getting higher, attacks to gain access to secret data (keys, credentials . . . ) into the communication device will become more severe.

Moreover, despite of the endless attempts to prevent software hacking, hackers still succeed to break the protection of software.

Embodiments of the present invention address these and other problems individually and collectively. Specifically, embodiments of the invention address the problem of security concerns with conducting payment transactions with a software smart card emulation into a communication device.

Therefore, it is an object of the present invention to provide a method for detecting unauthorized use of the payment application to tamper resistant the transaction.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned security drawbacks of transaction with a transaction application running into a communication device. The present invention provides techniques for enhancing the security of a communication device when conducting a transaction using the communication device.

This object is achieved through a method directed to detecting unauthorized use of the software transaction application and to silently compromising the ongoing transaction, the method comprising the steps of: testing the software transaction application for unauthorized use; if the testing finds the unauthorized use of the software transaction application indicating the unauthorized use of the software transaction application, driving the software transaction application to an abnormal behavior that can be only checked when a third party reply/check is requested (e.g. a server).

The method of the present invention proposes to introduce in the software application at least one specific and controlled detection point of unauthorized use. This list of detection points has a counterpart of set of values used to indicate a right status, i.e. no threat detected. The set of values may be hardcoded in the software transaction application.

When the code of the detection points is executed and none unauthorized use is detected, the hardcoded right values are retrieved. Instead, when an unauthorized use is detected at a detection point, a false value is generated. The right or false values are used to alter at least one sensitive data of the transaction. The altered sensitive data will contribute to the successful or failure of the ongoing transaction.

The altered sensitive data is transmitted to a computation module of cryptogram of the transaction application. The set of values used to indicate a right status, i.e. no threat detected may also be stored or hardcoded on the computation module of cryptogram side. The computation module of cryptogram restores the sensitive data knowing the original mapping of the detection values. But if sensitive data is altered with at least one false data, the restored data actually becomes a corruption.

The computation module of cryptogram use the restored data to compute a cryptogram to be sent to a server for authorization of the transaction. If the restored data is altered, the cryptogram will be wrongly computed, then the cloud (server) will reject the transaction and can detect the type of threat and can notify the user.

According to one embodiment, an application comprises a first module configured to detect unauthorized use and alter data and a second module configured to restore the altered data and to compute the cryptogram according to the restored data. The following steps 1 to 5 may be performed by the first module and the steps 6 to 8 may be performed by the second module:

(Step 1) Insertion of predefined detection points into the application code;

(Step 2) During a transaction, collection of all the detection results of all the detection points. Each detection result may indicate "no threat detected" or "unauthorized use detected";

(Step 3) Retrieving from a predefined map of "no threat detected" of the first module, the value associated to each detection result indicating "no threat detected";

(Step 4) Generating a random value for each detection result indicating "unauthorized use detected";

(Step 5) Alteration of at least one data manipulated during the transaction with the values of the detection results. The data manipulated may be a sensitive data as a PIN or a fingerprint data or a key.

(Step 6) Retrieving from a predefined map of "no threat detected" of the second module, the value associated to each detection point;

(Step 7) Restoration of the original manipulated data by applying a restoration function to the altered data and the retrieved values of the detection points;

(Step 8) Computation of a cryptogram from the restored manipulated data. From the computed cryptogram, a third party can authorize or reject the transaction.

With the present invention, an attacker would not be able to check the location of the detections (and so deactivate them) with only the application.

According to one embodiment of the invention, indicating unauthorized use of the application is carried out by: measuring the time of performing an operation by the software application, e.g. executing a process, performing a task, performing a function; indicating unauthorized use of the software application if the time exceeds a threshold.

According to one embodiment of the invention, indicating unauthorized use of the application is carried out by: obtaining an integrity indicator of the original form of one or more components of the software transaction application; obtaining an integrity indicator of the current form of the one or more components of the software application; if the integrity indicator of the original form corresponds to the integrity indicator of the current form, then indicating that the one or more components have not been tampered with, otherwise indicating that the one or more form have been tampered with.

According to one embodiment of the invention, indicating unauthorized use of the application is carried out by: controlling the operation of one or more functions to detect root level access to the one or more functions when the functions are directed at the sensitive material; providing a list of allowed processes related to the sensitive material; intercepting a function call directed to the sensitive material, the function call corresponding to a process on the software; identifying the process corresponding to the intercepted system function call; and for identified processes not included in the allowed process list, detecting the unauthorized use.

Root access provides an information handling device user authorization to manage the root, or the top-level directory, of the device file system. This essentially provides full control over a device. Consumers are generally only granted "emulated" level privileges, which provide a high level of functionality, but do not allow for full control over all aspects of a particular device.

According to one embodiment of the invention, indicating unauthorized use of the application is carried out by: detecting unauthorized modification or exploitation of the software program such as reverse engineering, code lifting, unauthorized analysis and access, and the like.

An advantage of the present invention is to increase the difficulty to break the protections applied to a software transaction application running into a smart card emulation.

The invention presents also the following advantages:

(1) There are no stopping conditions. The code is mixed up with useful code and the hacker does not have any clue of the error occurred until the transaction is rejected by the third party.

(2) It is a flexible technique because it is up to the developer to:

Decide the number of detection to insert;
Where to insert the detections;
Which data shall be altered and how;
Where to restore the data, in which phase of the software flow;

(3) It allows to "bind" the different parts of the software making difficult for the hacker to break in pieces the software and code lift specific parts to re-use them on untrusted application. Indeed, each flow of the software may have its own "execution signature".

(4) The more complex and random are the detections inserted and the higher is the number of detection inserted, the harder will be for the hacker to find them and remove them.

(5) It can allow the third party doing the verification on the cryptogram received to reject the ongoing transaction and to understand which kind of threat the system is exposed and so trigger specific risk policy management With the present invention, no verification or stop condition are inserted into the application when an unauthorized use is detected. Instead, the execution of the application continues corrupting silently the computation of the cryptogram. The malicious individual will not be able to understand why and when the generation of the cryptogram is failing.

To achieve those and other advantages, and in accordance with the purpose of the invention as embodied and broadly described, the invention proposes a method for enhancing security of a communication device when conducting a transaction using a transaction application installed into a communication device, the method comprising:

during runtime of the transaction application, testing the transaction application for detecting an unauthorized use, if said testing finds an unauthorized use of the transaction application generating a false data contributing to the failure of the transaction, otherwise generating a right data contributing to the successful of the transaction, altering a transaction data with the generated false data or the generated right data through an alteration mechanism in a reversible way, computing a transaction cryptogram from the altered data wherein the transaction is authorized based on at least whether the computed transaction cryptogram is the expected one.

According to an embodiment of the present invention, the computation of the transaction cryptogram comprises the following steps:

generating the right data,
restoring the transaction data with the generated right data through a reverse alteration mechanism, computing the transaction cryptogram with the restored transaction data.

According to an embodiment of the present invention, the step of testing the transaction application for detecting an unauthorized use comprises the following steps:
- inserting at least one marker into the transaction application according to a predefined protection scheme,
- inserting at least one detection agent at a marker position, a detection agent being configured to detect when the transaction application is in unauthorized use,
- when an unauthorized use is detected, the detector agent set a failure flag.

According to an embodiment of the present invention, the detection agent is configured to:
- set up the failure flag indicating that the transaction application is running under debugging mode,
- set up the failure flag indicating that at least one operation of the transaction application has been tampered with,
- set up the flag when detecting a root level access of the transaction application, or
- set up the failure flag indicating a reverse engineering of the transaction application.

According to an embodiment of the present invention, a right data is generated for each detector agent, this right data corresponding to a no threat detected status.

According to an embodiment of the present invention, the right data is generated during compilation time of the transaction application, this generated right data is stored in the alteration mechanism side and in the reverse alteration mechanism side.

According to an embodiment of the present invention, the generated right data is stored as hardcoded data in the alteration mechanism side and in the reverse alteration mechanism side.

According to an embodiment of the present invention,
- the alteration mechanism intersperse the right or the false data generated into the data stream of the transaction data,
- the reverse alteration mechanism comprises an extraction mechanism that discards the interspersed data, if the interspersed data corresponds to its generated right data, otherwise the interspersed data is not discard and the restored transaction data returned as response is corrupted.

According to an embodiment of the present invention, the alteration mechanism and the reverse alteration mechanism is a XOR operation.

According to an embodiment of the present invention, the computed cryptogram and a type of the detector agent having set up a failure flag indicating the kind of unauthorized use are sent by the communication device to a remote system.

According to an embodiment of the present invention, the remote system authorizes or rejects the transaction based on a verification and validation of the cryptogram.

The present invention also relates to a communication device comprising:
- a processor; and
- a memory coupled to the processor and storing a transaction application that performs operations for enhancing security of the communication device when conducting transaction using the communication device, said transaction application being configured to implement the present invention.

The present invention also relates to a transaction application for enhancing security of a communication device when conducting transaction using the communication device, wherein
- the transaction application comprising a processing unit comprising a detection threat mechanism, said detection threat mechanism configured for detecting unauthorized use of the transaction application,
- the processing unit comprising a generator of data which generate a right data when no threat is detected by the detection threat mechanism and a false data when an unauthorized use,
- the processing unit comprising an alteration mechanism configured to alter a transaction data with the generated data in a reversible way,
- the transaction application comprising a controlling unit, the controlling unit comprising a generator of right data,
- the controlling unit comprising a reverse alteration mechanism configured to reconstruct the transaction from the transaction data altered by the processing unit and the right data generated by its generator,
- the controlling unit comprising a security module configured to compute a cryptogram from the reconstructed transaction data.

According to an embodiment of the present invention, the security module is a white box cryptography or a Trusted Execution Environment.

According to an embodiment of the present invention, the processing unit and the controlling unit are in the form of a software developer kit integrated into the transaction application.

According to an embodiment of the present invention, the processing unit is implemented in platform independent code and the controlling unit is implemented in native code.

According to an embodiment of the present invention, the platform independent code is Java, JavaCard™ or .NET.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
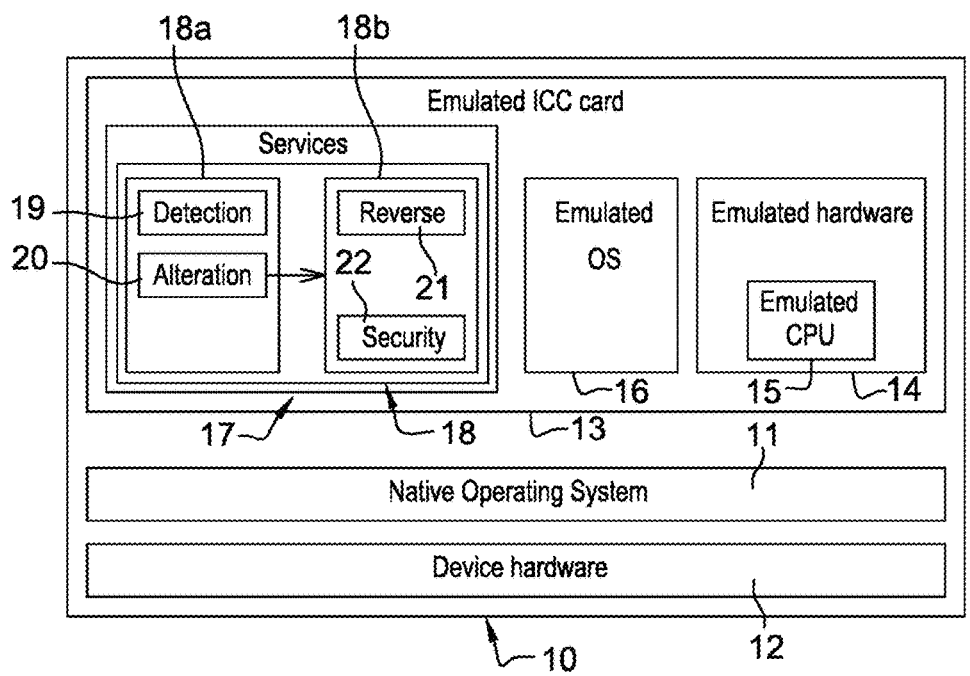
FIG. 1 illustrates the different entities in a communication device involved in a transaction

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements and steps which are useful to the understanding of the present invention have been shown in the drawings and will be described.

Further, the mechanisms of data communication between the parties and their environment have not been detailed either, the present invention being here again compatible with usual mechanisms.

Furthermore, the connecting lines shown in the various figures contained herein are intended to represent exemplary functional relationships and/or physical couplings between the various elements. It should be noted that many alternatives or additional functional relationships or physical connections may be present in a practical system. Furthermore, the various entities in FIG. 1 to FIG. 7 may communicate via any suitable communication medium (including the Internet), using any suitable communication protocol.

Described herein in various implementations are systems and methods for providing secure communication, secure data transfer and storage, authentication and transaction authorization which can be performed through a communication device with or without a secure element. Embodiments of the present invention provide techniques for enhancing the security of the communication device when conducting a transaction using the communication device without involving a secure element. The techniques described herein can be used with a communication device that may or may not have a secure element, because the techniques do not require the use of a secure element but the secure element could be present.

In the example of implementation described hereinafter, the present invention provide techniques for enhancing the security of the communication device when conducting a transaction using the communication device by using an emulated Integrated Circuit Card ICC 13 also called emulated ICC card 13.

In a non-limitative embodiment, the emulated integrated circuit card ICC is an emulated smart card. In a non-limitative example, the emulated smart card is an emulated banking card, such as an emulated EMV card.

Emulation refers to the use of a computer program or hardware to provide (i.e., emulate) the functionality of other software or hardware. An emulator can include modules that correspond to hardware components of an emulated device. For example, an emulator can provide emulation of a central processing unit (CPU), memory subsystem, and input/output devices. In the case of emulation by a software-based emulator, an operating system and other applications can be interpreted by the emulator, rather than being run by native hardware. A software-based emulator can also emulate a particular hardware architecture than the architecture of a host device on which the emulator executes.

For example, in the embodiment described herein, an emulator is configured to emulate the integrated circuit (e.g., a CPU) that has a different instruction set than a physical integrated circuit of the host device. The emulated integrated circuit card ICC 13 can duplicates the instruction cycle and instruction cycle timing of the physical integrated circuit.

The emulated ICC card 13 can include emulated hardware, operating systems, software modules, applications, plugins, runtime environments, graphics engines, input/output methods, drivers, abstraction layers clients, connection protocols, security protocols, storage, memory, and virtualized peripherals. Further, the emulated ICC card can select different CPU instructions sets for operation that can be different from the instruction set used by the CPU of the host device.

The emulated ICC card 13 can execute on an operating system (OS) 11 of a host device 10 and can enable device-based authentication/authorization services for mobile and electronic commerce merchants and service providers.

For example, the emulated ICC card can provide transaction authorization request through a mobile application 18 in a secure manner. In other instances, the emulated ICC card 13 enables the secure storage, exchange, and transmission of information to and from various forms of mobile and non-mobile devices, instruments, computers, and other systems.

Further, various devices, systems, programs, instruments, and equipment can be emulated using the techniques described herein, such as, kiosks, workstations, handheld devices for point of sale systems, banking devices, automated teller machines, retail and payment systems, healthcare devices, defense and government equipment, voting and data collection devices, and other data storage and transmission devices.

Prior to discussing the details of some embodiments of the present invention, description of some terms may be helpful in understanding the various embodiments.

An "issuer" may typically refer to a business entity (e.g., a bank) that maintains an account for a user that is associated with a portable communication device such as an account enrolled in the mobile application 18 installed on the portable communication device 10. An issuer may also issue account parameters associated with the account to a portable communication device. An issuer may be associated with a host system that performs some or all of the functions of the issuer on behalf of the issuer.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction such a cryptogram. The authorization request message may also include other information such as information that identifies the access device that generated the authorization request message, information about the location of the access device, etc.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device.

In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

In the following description:
source code may refer to programming code that is a platform independent code. The source code is interoperable as it may be run without being modified on any kind of devices such as an integrated circuit card ICC which supports a virtual machine VM. It is written in a portable language and run by a virtual machine. Once compiled, the source code generates virtual machine instructions;
virtual machine instructions refers to programming code that is run through a virtual machine instead of a unit processor, such as the unit processor of the ICC. Such programming code is a platform-independent code. Said virtual machine instructions are issued from the compilation of source code;
a virtual machine VM is an interpreter which decodes and executes virtual machine instructions;
a native function refers to programming code which when compiled generates a native code;
native code (also called machine language) refers to programming code that is configured to run on the unit processor. Native code will generally not run if used on a unit processor other than the one it was specifically written for. It is a platform-dependent code. In the example of the emulated integrated circuit card ICC, a native code is linked to the emulated unit processor of said emulated integrated circuit card;
an operation (also called functionality) refers to a functional process; and
an instruction refers to a code instruction.
In non-limitative examples:
the source code may be written in Java, .NET or JavaCard™ or any existing platform independent language.
the native function may be written in the C language, assembler language or C++ language or any existing platform dependent language.
These non-limitative examples will be taken in the following description.

Referring to FIG. 1, in one implementation, a user communication device 10 comprises a native operating system 11 executing on a device hardware 12. The communication device 10 can be a mobile or other device, such as a smartphone, smart watch, smart glasses, tablet computer, desktop computer, portable computer, television, gaming device, music player, mobile telephone, laptop, palmtop, smart or dumb terminal, network computer, personal digital assistant, wireless device, information appliance, workstation, minicomputer, mainframe computer, or other computing device that can execute the functionality described herein.

The native operating system 11 can be a mobile, desktop, server, or other operating system such as an Apple iOS® platform, a Google Android™ platform, a Microsoft Windows® operating system, an Apple OS X® operating system, a Linux® operating system, a variants of a UNIX® operating system, and the likes.

Device hardware 12 can include one or more processors suitable for the execution of a computer program, including both general and special purpose microprocessors. Generally, a processor receives instructions and data stored on a read-only memory or a random access memory or both. Information carriers suitable for embodying computer program instructions and data include all forms of non-volatile memory. One or more memories can store instructions that, when executed by a processor, form the modules and other components described herein and perform the functionality associated with the components. The processor and the memory can be supplemented by, or incorporated in special purpose logic circuitry.

The communication device 10 can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In one implementation, a software processing module of the communication device 10 comprises the emulated ICC card 13. The emulated ICC card can include emulated hardware 14 and emulated software, such as emulated operating system 16. Emulated hardware 14 can include one or more emulated processors, such as emulated central processing unit (CPU) 15, emulated memories and other storage mediums, emulated input and/or output devices, emulated communications ports and other interfaces, and so on. The emulated operating system 16 can be configured to communicate with the native operating system 11 through an emulated network interface of the emulated ICC card 13.

The emulated ICC card 13 can also comprise services container 17, in which one or more services can execute. The services 17 can include, but are not limited to, secure input/output, storage, key management, Quick Response Code (QRC) management, near field communication (NFC), mobile applications 18, Host Card Emulation software and other security and storage services.

The mobile application 18 may be provided by a mobile application provider. For example, if the provider of mobile application 18 is an issuer, the mobile application 18 may be a mobile banking application or a separate mobile payment application. If the provider is a mobile wallet provider such as a mobile network operator or third-party wallet provider that supports multiple issuers, the mobile application 18 may be a mobile wallet application. For merchants, the mobile application 18 may be a merchant's own mobile application from which consumers can conduct e-commerce or point of sale transactions with that merchant, or may be a mobile wallet application that supports multiple merchants. The provider of the mobile application 18 can be others suitable entities.

In a non-limitative implementation, the card emulation technology (e.g., Host Card Emulation (HCE), etc.) allows to emulate a smartcard on the communication device 10 (e.g., a portable communication device) to allow the mobile application 18 running on the portable communication device to conduct transactions such as contactless transaction. In the card emulation environment, the mobile application 18 can access the contactless interface of the portable communication device 10 via the operating system (OS) 11 of the portable communication device 10.

Examples of contactless interface may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface may include an optical interface (e.g., a display screen) to present payment information in the form of an image such as a quick response (QR) code, or bar code, etc. to a contactless which includes an optical code scanner or reader.

In an embodiment, the mobile application 18 comprises a processing unit 18a and a controlling unit 18b. The processing unit 18a and the controlling unit 18b of the mobile application can be in the form of a software developer kit (SDK)) integrated into the mobile application to support the transaction functionalities. The processing unit 18a and the controlling unit 18b may perform functions to facilitate transactions such as to generate transaction cryptograms for transmission to a remote system 21. In an embodiment, the processing unit 18a may comprise a threat detection mechanism 19 and an alteration mechanism 20. The controlling unit 18b may comprise a reverse alteration mechanism 21 and a security module 22. The security module 22 may be implemented with a highest level of security.

In an embodiment, the security module 22 may comprise a White box cryptographic, or "WB cryptographic," which is a unique cryptographic technology that protects cryptographic algorithms so that their operations can execute within a hostile environment without leaking a cryptographic key and other cryptographic values.

In another embodiment, the security module 22 may comprise a TEE (Trusted Execution Environment).

Figure 2:
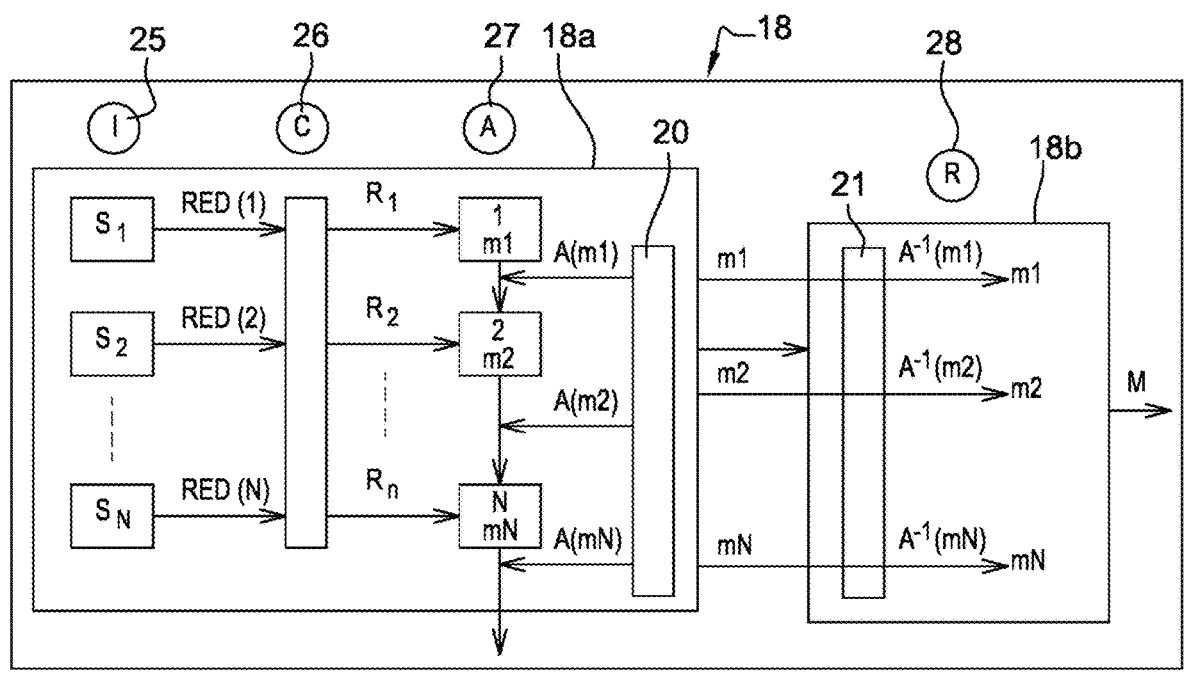
FIG. 2 is an overview logic flow diagram in accordance with an exemplary embodiment of this invention during the computation of the cryptogram.

As illustrated in FIG. 2, in an embodiment, the detection threat mechanism 19 is configured to insert markers into the mobile application 18, during an insertion phase 25. The markers can be arranged within the application 18 according to a protection scheme desired for the mobile application 18.

In an embodiment, the detection threat mechanism 19 comprises one or more detection agent $S_1, S_2 \ldots S_n$. A detection agent is a portion of software code that detects when the mobile application 18 is tampered with or under attack. There are two basic functions most detection agents perform when they are invoked: detect change to a portion of the application, and set a failure flag if any.

The detection threat mechanism 19 is configured to inject at least one detection agent instruction into the mobile application 18 into at least one marker position wherein the detection agent instruction is operable to deter tampering/attack with the mobile application 18.

In a non-limitative enumerative list, a detection agent can be a function that detects if the communication device 10 is rooted. A detection agent can detect if the mobile application 18 is running into an emulator. A detection agent can detect if the mobile application 18 is in debugger mode or a debugger has been attached. Of course these examples of detection agents are merely examples, and others detection agents can be employed for indicating reverse engineering, code lifting, unauthorized analysis, debugging and access, and the like. Some embodiments of detector agents are described hereinafter.

In an embodiment, at least one detection agent $S_x$ of the detection threat mechanism 19 is introduced into the mobile application 18 to detect if the mobile application 18 is being executed in a debug mode. In one embodiment, the debugging detection agent can measure the time it takes to perform an operation (process, function, etc.) of the mobile application 18, and if it takes more time than expected, than it is usually because someone is debugging the software. The clock may be the communication device's clock. Upon starting an operation, the current time is sampled from a clock device. Upon terminating the operation, the time is sampled again from the clock, and the time the operation has been active is calculated. If the time that takes the operation to be performed is greater than the reasonable time to perform the operation, than it indicates that the mobile application 18 is in debugging mode. In this case the detection agent set a failure flag.

Of course the debugging detection method described is merely an example, and others debugging detection methods can be employed for indicating that at least one operation of the mobile application 18 is being executed in debug mode.

In an embodiment, at least one detection agent $S_x$ is introduced into the mobile application code to detect if at least one operation of the mobile application 18 is amended. A digital signature of at least one operation (process, function, etc.) of the original mobile application 18 is calculated. In an embodiment, this can be carried out at the manufacturer site. In an embodiment, the digital signature is stored in a secure memory of the emulated ICC card, but also can be stored elsewhere. The digital signature of the current form of the operation is calculated. This can be done, for example, during the execution of the mobile application 18 that the operation belongs to. If the digital signature of the current form of the operation corresponds to the digital signature of the original form of the operation, than the operation has not been tampered with, otherwise the operation has been tampered with. When the detector agent $S_x$ detects that the operation has been tampered with, a failure flag is set up.

This procedure authenticates the program image. It provides a mechanism for detecting changes made to executing the mobile application 18, where those changes might be caused by transmission errors or malicious attacks on the application. Any unauthorized change in the mobile application 18 will results in a failure during the verification process.

Of course a digital signature is merely an example, and other existing integrity indicators can be employed for indicating that at least one operation of the mobile application 18 code has not been tampered with, such as checksum, hash and the like.

In an embodiment, at least one detection agent $S_x$ is introduced into the application to detect if an unauthorized access by a root level of the mobile application 18 is ongoing. In one embodiment, it is predetermined known processes that are permitted to execute critical part of the mobile application 18 that the system wishes to protect. All processes will have associated process IDs, typically consisting of a numerical value. The IDs of identified processes are added to a white list.

In one embodiment, to predetermine these process IDs, the mobile application 18 can be run in test mode, possibly in a laboratory environment. The execution of the mobile application 18 can be examined to determine which processes are needed for operation. The IDs associated with the processed identified by the test run are added to the white list of allowed processes.

After this initial elaboration of the white list, which typically occurs only once, the detection agent $S_x$ will screen function calls to allow only this list of processes to interact with protected material. If the target directory or memory area or application is sensitive material that the system wishes to protect, the detection agent examines the process ID of the requesting process and to allow only known processes to execute. If the process ID does not match an ID on the white list of allowed processes, the detection agent set a failure flag.

Of course the rooting detection method described herein is merely an example, and others rooting detection methods can be employed for indicating that the at least one operation of the mobile application 18 is being executed in root level mode.

At each detector agent is associated a right data corresponding to a "no threat detected" status. These right data are previously generated and stored both in the processing unit 18a side and in the controlling unit 18b side. In an embodiment, these right data are generated during compilation time of the mobile application 18.

The detection threat mechanism 19 comprises a function $RED(S_x)$. If there is no threat detected by a detection agent $S_x$, the function $RED(S_x)$ extracts the corresponding right data to be provided as return response. In an embodiment, if a failure flag is set up by the detection agent $S_x$, the function $RED(S_x)$ can generate a random false data and return as response this generated false data $F_x$.

During execution of the detection mechanism 19, the responses from the function $RED(S_x)$ are put in a buffer, during a collection phase 26 of all the detection results.

The responses in the buffer collected during the collection phase 26, are sent as input to the alteration mechanism 20, during an alteration phase 27 of the processing unit 18a of the application 18. The alteration mechanism 20 is configured to alter data in some reversible way.

In an embodiment, the alteration mechanism 20 is configured to alter data, in a synchronized way such that the altered data is reversible at the destination resource (the reverse alteration mechanism 21 of the controlling unit 18b of the application 18). Some embodiments of alteration mechanism will be described herein after.

In an embodiment, the data M to be altered is one of the inputs of the alteration mechanism 20. The alteration mechanism 20 may split the data M in $m_1$, $m_2$ to $m_n$ messages. In an embodiment the data M is split according to the number of markers inserted into the application. Each partial message $m_x$ may be altered with at least one response of the function $RED(S_x)$. All altered partial message $\underline{m}_x$ are sent to the controlling unit 18b of the application 18 for recovering the original data M.

During a phase of restoration 28, the reverse alteration mechanism 21 may extract the right data associated to each detector agent and stored in its side. The reverse alteration mechanism 21 may reverse each altered partial data $\underline{m}_x$ with the corresponding extracted right data to reconstruct a copy of the original partial data $m_x$. From all the reconstructed partial data $m_x'$, the reverse alteration mechanism 21 may reconstruct a copy of the original data M. The reverse alteration mechanism 21 provides a reverse data M' resulting from the received altered data and the extracted right data.

The insertion phase 25 can occur during compilation time. The collection phase 26, the alteration phase 26 and the restoration phase 28 can occur during execution time of the application 18.

The restored data M' is sent to the controlling unit 18b to generate the cryptogram. This cryptogram is sent to the remote system 51 to authorize the ongoing transaction based on a verification and a validation of the reconstructed data M'.

If the restored data M' corresponds to the original data M, then the verification made by the remote system will be successful and the transaction will be authorized. If instead, at least one failure flag is triggered, the restoration to the original data M won't be possible and the restored data M' is actually corrupted. The computed cryptogram from this restored-corrupted data M' is sent to the third party (remote system) for verification. The transaction will be rejected and the remote system 51 can notify the user of the failure of the transaction.

With the present invention, the detection threat mechanism 19 allows to detect tampering with or attack without stopping the mobile application 18 execution, i.e. without triggering any flag that could be detected by the malicious individual during debugging or static analysis. Indeed, since both operation of alteration and restoration happen in the code flow, the attacker will not detect them because there is no stopping condition at the markers positions. The stop condition is actually on the third party side. The most unreachable is the third party, the harder will be for the attacker to be able to detect the alteration mechanism process in the code.

More the number of detection agents inserted in the application is higher more the search and, eventually, the attempt to remove all the detections will request an amount of time that would make the attack unsuccessful.

Figure 3:
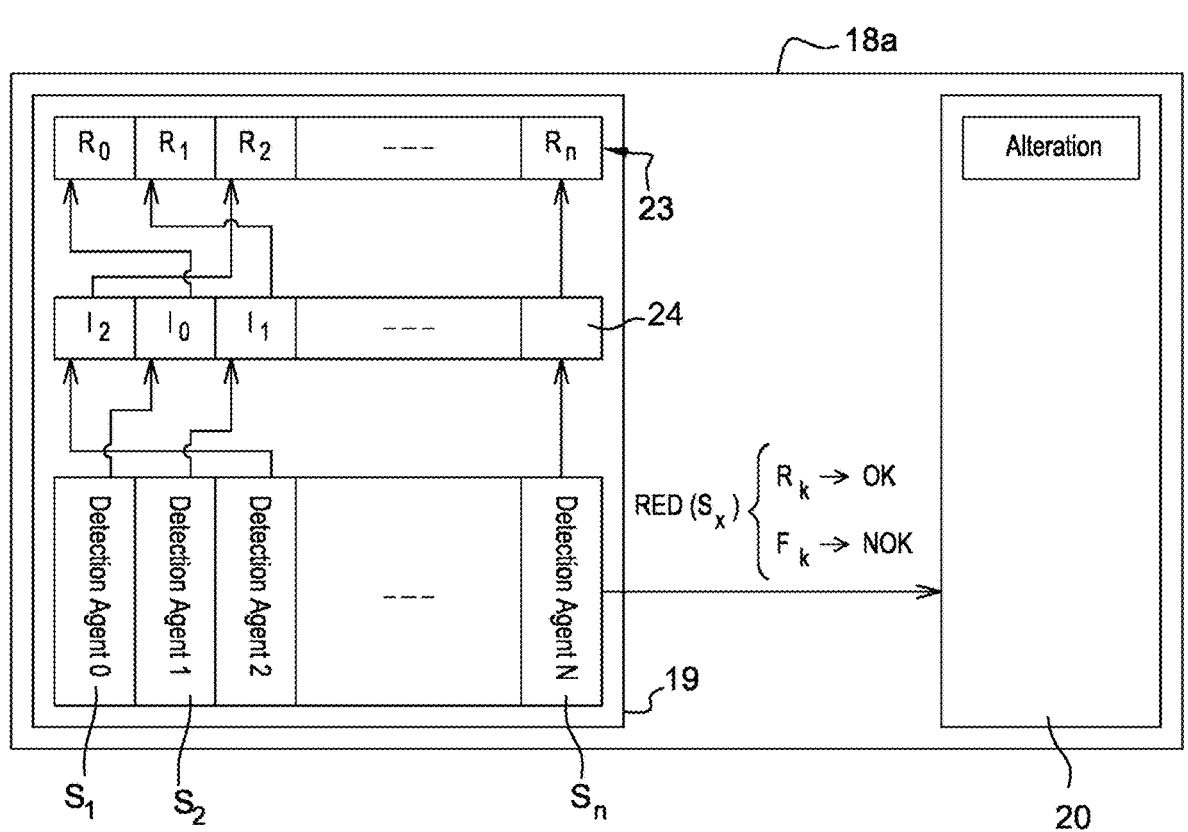
FIG. 3 illustrates the different entities involved in the alteration process of a transaction data in accordance with an exemplary embodiment of this invention.

In an embodiment, as illustrated in FIG. 3, a mapping list of right data 23 is defined. The mapping right data 23 comprise a set of predefined right data $R_x$. The right data $R_x$ is a detection value that corresponds to a "not compromised" state of the detection agent $S_x$. In a non-limitative example, the right data $R_x$ is randomly generated. The right data can be an integer or any kind of data. Each right data $R_x$ of the mapping data 23 is associated to a detection agent $S_x$ inserted into the mobile application 18.

In one embodiment, the mapping data 23 can be generated once and stored as "hardcoded" data in both the processing unit 18a and the controlling unit 18b. In another embodiment, the mapping data 23 is stored in a secure memory of the emulated ICC card 13 or in any others memory.

In an embodiment, as illustrated in FIG. 3, a mapping Index 24 is defined. The mapping index 24 comprise a list of indexes $I_x$. Each index $I_x$ in the mapping index 24 refers to a marker position inserted into the mobile application 18. Therefore, each index $I_x$ of the mapping index 24 can refer to a position of at least one detection agent $S_x$ inserted into the mobile application 18. The size of the mapping index 24 is given by the number of detection agents inserted. Each index $I_x$ is an offset in the mapping data 23. In a non-limitative example, the index $I_x$ can be an integer generated randomly.

In one embodiment, the mapping index 24 can be generated once and stored as "hardcoded" data in the processing unit 18a. In another embodiment, the mapping index 24 is stored in a secure memory of the emulated ICC card or in any others memory.

If there is no threat detected by a detection agent $S_x$, the function $RED(S_x)$ extracts the corresponding index $I_x$ in the mapping index 24 and provides as response the corresponding right data $R_x$ from the mapping data 23 associated to the said detection agent $S_x$.

In an embodiment, if a failure flag is set up by a detection agent $S_x$, the function $RED(S_x)$ can generate a random false data and return as response this generated false data $F_x$ that has to be used for the given detection agent $S_x$.

All the responses provided by the function $RED(S_x)$ are sent as input to the alteration mechanism 20. The alteration mechanism 20 receives also as input the data to be altered. In an embodiment the data to be altered may be split in at least two partials block of data. Each partial data is altered with the received responses through a reversible alteration operation.

In an embodiment, the alteration mechanism 20 may intersperse meaningless or intentionally the provided data by $RED(S_x)$ into the data stream to be altered as appropriate, e.g., as one or more bits, blocks, packets or other data groupings. At the destination resource (the reverse alteration mechanism 21), a reverse alteration mechanism extracts the right data and reverses the altered data to reconstruct a copy of the original data. The reverse alteration mechanism 21 may comprise an extraction mechanism that discards the interspersed data, if and only if the interspersed data correspond to the extracted right data. Otherwise, the interspersed data is not discard and the original data is corrupted.

To keep the software alteration mechanism 20 (the source) and the reverse alteration mechanism 21 (the destination) synchronized with respect to what parts of the data is altered and reverse altered, a number of algorithms may be provided that may vary based on some external factor. For example, the system clock or a counter may be used to vary the operating modes at the source and destination over time, so that the data (e.g., bits) that are padded and removed are not consistently the same ones from the perspective of an outside observer. Information may also be concealed within the padded data to help synchronize.

Alternative implementations may combine an interspersion mechanism with a rearrangement mechanism so that not only is data padded before transmission but order of the data (e.g., certain bits or packets) is also rearranged. A like rearrangement and extraction mechanism on the data source reconstructs the received data into a copy of the original data, if the interspersed data correspond to the extracted right data.

In an embodiment, the altered data is generated through an operation between the received data resulting from the detection threat mechanism 19 and the data to be altered, in particular through a reverse alteration operation such as an XOR operation.

Figure 4:
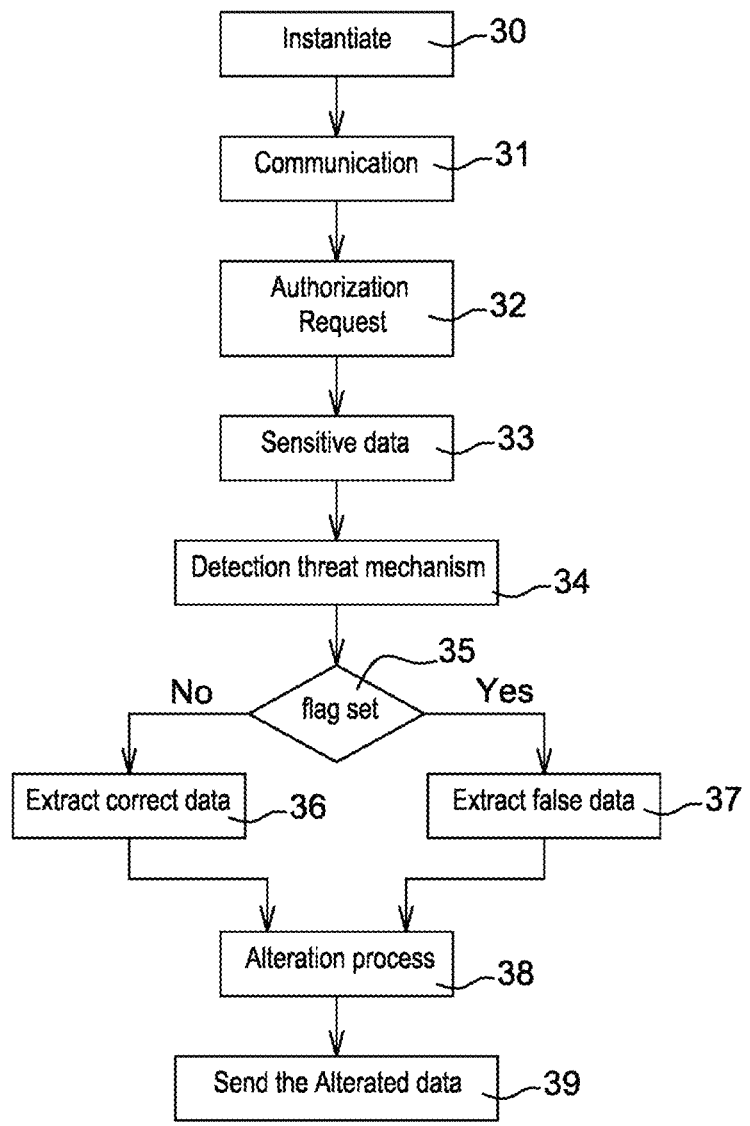
FIG. 4 is a logic flow diagram in accordance with an exemplary embodiment of this invention during the alteration process of the transaction data.

Referring now to FIG. 4, in one implementation, one or more secure communication channels are created in order to authorize a transaction, such as a purchase, an account login, a secure data transfer, or other transmission, request for, or receipt of data or property requiring a form of authentication/authorization. In general, a secure communication channel refers to a connection between two or more endpoints for the transfer (sending and/or receiving) of data in a secure manner (e.g., by encrypting the data) in any existing forms of secure communication.

In step 30, an access device 57 (see FIG. 6) can make a call to a framework linked to the mobile application 18, and the framework instantiates an emulator (e.g., emulated ICC card 13) on a host device (e.g., user device 10). Communication operations can then be performed under the control of one or more operating system processes executed on the emulated integrated circuit. A communication channel, in step 31, can be established when the access device 57 makes an initialization call to the framework.

In step 32, the emulated operating system receives a request to authorize a transaction over the communication channel and sourced from the access device 57. Various types of requests can be made via the framework, including a request to authorize the use of a service provided by or through the emulator, a request to determine if there is a secret associated with the use of an instrument (e.g., information associated with a credit card), or a request to verify the validity of a secret (e.g., the validity of a credit card number captured by the emulator).

In step 33, based on the received request, the mobile application 18 determines the data to be altered by the alteration mechanism A. in an embodiment, the data to be altered is a sensitive data. The sensitive data can be password, credit card data, key, access account information or any information that may be desirable to protect from access.

In an embodiment, the sensitive data is from a user input. In this case, the emulated operating system can obtain user input from an input device of the host device. The input data can refer to data that authenticates the identity of the user and can include, for example, a credit card security code (CSC), a QRC, date of birth, a shared secret, visual recognition, a biometric identifier, and/or information received from a magnetic stripe or an integrated circuit (e.g., an embedded microchip) on a payment card.

In one implementation, the input device is a touchscreen. The emulated operating system can create a screen buffer for a virtual input device representing a touchscreen graphical device and can draw to the buffer to create the appropriate representation of user controls (e.g., a keypad). The user input based on the user's interactions is captured and directed to application-specific modules running in the emulated operating system which can encode and transmit the captured input.

The input device can also be, for example, a built-in device (e.g., a touchpad, pointing stick, click wheel, camera, microphone, gyroscope, accelerometer, built-in keyboard, etc.), and/or an separate input peripheral coupled to the host device (e.g., mouse, keyboard, trackball, joystick, camera, microphone, game controller, virtual headset, etc.). The user input can be, for example, a touchscreen gesture, a mouse gesture, a tap, a click, a click-and-drag, a tracked eye movement, a button press, a video feed of the user's face, an applied pressure, or other action suitable for allowing a user to provide input to the host device.

In another embodiment, the sensitive data is provided by the access device 57.

In step 34, the detection threat mechanism 19 starts. It should be noted that the detection threat mechanism 19 can start before, during, after or upon executing the mobile application 18. The detection agents instructions introduced into the mobile application 18 are executed.

In step 35, for each detection agent executed, it is determined if the failure flag is set up. If there is no threat detected by said detection agent $S_x$, the function $RED(S_x)$, in step 36, extracts the corresponding index $I_x$ in the mapping index 24 and return the corresponding right data $R_x$ from the mapping data 23. If a failure flag is set up by the detection agent $S_x$, at step 35, the function $RED(S_x)$ generates a random value and provide $F_x$ as response.

All the responses provided by the function $RED(S_x)$ are sent as input to the alteration mechanism 20. In step 38, the alteration mechanism 20 starts. It should be noted that the alteration mechanism can start before, during, after or upon executing the detection threat mechanism 19. The alteration mechanism alters the sensitive data with the data provided by the function $RED(S_x)$.

At step 39, the processing unit 18a transmits the altered data to the controlling unit 18b of the mobile application 18.

Figure 5:
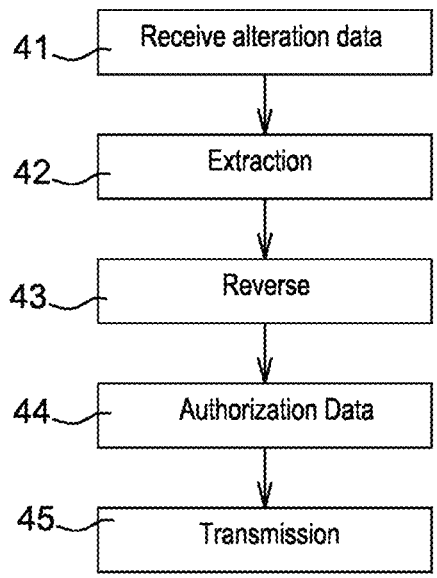
FIG. 5 is a logic flow diagram in accordance with an exemplary embodiment of this invention during the computation process of the cryptogram.

Referring now to FIG. 5, in one implementation 40, the controlling unit 18b receives an altered data from the processing unit 18a, in step 41. In step 42, the reverse alteration mechanism extracts the right data $R_x$ from its mapping data 23. The reverse alteration mechanism reverses the altered data to reconstruct a copy of the original sensitive data. The reverse alteration mechanism provides a reverse data resulting from the received altered data and the extracted right data.

In step 44, the security module 22 receives as input the reverse data. The security module 22 computes a cryptogram from the reverse data. The controlling unit 18b sends, in step 44, an authorization request message comprising the cryptogram to the remote system 51. Based on a verification and a validation of the received cryptogram, the remote system 51 authorize or reject the ongoing transaction.

In some implementations, the remote system 51 does not itself authorize the transaction, but securely transmits the cryptogram to an issuer associated with the transaction.

Upon receiving the authorization request, the remote system 51 analyses whether the cryptogram is the expected data. If the answer is yes, i.e. when the provided data corresponds with the expected data, then the transaction is successful. If the answer is no, i.e. when the provided data does not correspond with the expected data, then the transaction is denied. With the present invention, the reverse alteration becomes a corruption in the case a detection is triggered. The computed cryptogram will be wrong and the verification at the remote side will failed.

The remote system 51 can alert the user, informing him that his user device is compromised and should be denied authorization or otherwise banned from performing transactions. User can be worn by the remote system by a SMS message. However, the subject matter herein is not limited to the example in which users are notified of unsuccessful transaction and/or the threat through the remote system. Users may be notified in any manner.

In an embodiment, instead of defining a right data for each detection agent, only one right data is stored as "hardcoded" data in both the processing unit 18a and the controlling unit 18b side or in any memory. This right data is extracted by the detection threat mechanism 19 when none failure flag is set up by a detector agent. Otherwise, if at least one failure flag is set up, a random data is generated by the detection threat mechanism 19. This extracted right data and/or the random false data may be used to alter the data to be altered.

In an embodiment, instead of pre-stored the mapping right data 23, the processing unit 18a and the controlling unit 18b comprise respectively an embedding function for generating a One Time Password (OTP) as a right random data. In this case, when a detection agent return no threat detected an OTP associated to this detection agent is generated by the processing unit 18a. When the controlling unit 18b receives the altered data, an OTP is generated to restore the altered data. When a detection agent return threat detected a random false data is generated.

In an embodiment, a mapping type is defined. The mapping type comprise a list of nature of unauthorized use (detector agent) inserted. Each nature in the mapping type refers to a category of a detector agent such as debugging, rooting level, running on an emulator, code amended, reverse engineering . . . .

The size of the mapping type is given by the number of detection agents inserted. Each index $I_x$ of the mapping index 24 is an offset in the mapping type. In one embodiment, the mapping type can be generated once and stored as "hardcoded" data in the processing unit of the application. In another embodiment, the mapping type is stored in a secure memory of the emulated ICC card or in any others memory. When a failure flag is set up by a given detection agent, the function $RED(S_x)$ extracts the corresponding index $I_x$ in the mapping index 24 and extract the corresponding category of the detection agent from the mapping type. The altered data and the type of the detector agent extracted are sent by the processing unit 18a to the controlling unit 18b.

In an embodiment, the mapping type and the mapping index are stored as "hardcoded" data in the controlling unit 18b. In this case, when a failure flag is set up by a given detection agent, the function $RED(S_x)$ extracts the corresponding index $I_x$ in the mapping index 24. The altered data and the extracted index are sent by the processing unit 18a to the controlling unit 18b. The controlling unit 18b extracts the corresponding type of the detector agent from his mapping type and the received index.

The authorization request send by the controlling unit 18b to the remote system 51 comprises the cryptogram and the nature of the detector agent. From the nature of the unauthorized use, the remote system can know which kind of threat the smartphone/Application/user are exposed and can take appropriate action.

There are many possible forms of appropriate action the remote system 51 can take, and the following are some examples. In one embodiment, the remote system can apply a risk of management policy. In a non-limitative example the risk of management policy could be:
- if the verification of the cryptogram is successful, the transaction is allowed;
- if a device rooted is detected, the verification will failed but the transaction can be allowed. An observer mechanism can be trigger in the communication device 10 to check the use;
- if a debugging mode is detected, the verification will fail and the transaction is rejected. The user is notified. Etc. . . . .

In an embodiment, a mapping false data is defined. The mapping false data comprise a set of predefined false data. The false data is a detection value that corresponds to a "compromised" state of the detection agent $S_x$. In a non-limitative example, the false data is randomly generated. Each false data of the mapping false data is associated to a detection agent $S_x$ inserted into the mobile application 18. In one embodiment, the mapping data can be generated once and stored as "hardcoded" data in the processing unit 18a or in a secure memory of the emulated ICC card or in any others memory. Each index $I_x$ of the mapping index is an offset in the mapping false data. If a threat is detected by a detection agent $S_x$, the function $RED(S_x)$ extracts the corresponding index $I_x$ in the mapping index 21 and provides the corresponding false data from the mapping false data. The response provided by the function $RED(S_x)$ is sent as input to the alteration mechanism.

The present invention proposes a method implementing a technique to detect the threats silently, i.e. without "stop condition". The threat is finally indirectly detected on the cloud (remote system 51) since the cryptogram verification will fail and the user could be notified of the potential threat.

An example of implementation and transaction using the present system and techniques will now be described at FIG. 6 and FIG. 7. The components of system 50 may include the remote system 51 to manage transactions conducted using the portable communication device 10. The remote system 51 may be implemented using one or more computing devices or computers, such as one or more server computers, and can be associated with or be operated by a service provider such as an issuer, payment processor, and/or other suitable entities. The remote system 51 may manage user accounts, provide verification functions for transactions, manage lifecycle messages from issuer/host system, as well as initiate lifecycle management events.

To ensure that the transactions are processed appropriately, several core functions are implemented in the remote system 51 (not shown) to manage the deployment and usage of the account parameters. These functions may include provisioning, active account management, verification for payment, transaction processing, lifecycle management, and post-payment processing.

The remote system 51 may perform enrollment functions to enroll a mobile cardholder, and a set of provisioning functions that facilitates the preparation and delivery of account parameters. The remote system 51 may perform account parameters replenishment functions to facilitate the account parameter replenishment process for the provision on portable communication device, and account management functions that manage the replenishment.

In this implementation, the mobile application 18 is a payment application.

The processing unit 18a may comprise a provisioning service 52 configured to facilitate communications between the mobile application 18 executing on the portable communication device 10 and other entities in the remote system 51. The provisioning service 52 may communicate with the remote system 51 via a communications network such as the Internet.

In some embodiments, the provisioning service 52 may implement authentication and signature functionalities to authenticate the user and/or the portable communication device 10 when the portable communication device 10 communicates with the other entities of the remote system 51. The authentication functionalities may ensure that a user and/or a portable communication device 10 communicating with the system is an authorized one.

The provisioning service 52 may comprise a set of provisioning functions that facilitates the management of account parameters. The provisioning service 52 may comprise account parameters replenishment functions to facilitate the account parameter replenishment process from the remote system 51 on the portable communication device 10.

The provisioning service 52 in charge of establishment and maintaining a secure communication channel with the remote system 51 may be triggered by the remote system 51.

The processing unit 18a may comprise a digitized card manager 53 configured to manage appropriately on the portable communication device the set of account parameters provided to the mobile application 18b by the remote system 51. The digitalized card manager 53 comprises a set of functionalities to manage account parameters for transactions conducted using the user communication device 10.

The processing unit 18a of the application 18 may comprise a Card Holder Code Verifier 54. This Card Holder Code Verifier 54 provides the means to manage in a secure way user inputs in the format of digits. It can be used to manage PIN and activation code inputs.

The processing unit 18a may comprise a payment service 55. This component may comprise:
- an interface for the payment application to allow the user to retrieve information on the card provisioned (state of activation, card details). This information is retrieved from the digitized card manager 53.
- an interface to allow the payment application to communicate with the access device terminal 57 through contactless (Bluetooth, NFC) communication.
- an interface to access to a payment engine 58 of the controlling unit 18b of the mobile application 18.

The payment engine 58 may be a component completely implemented in C that may implement VISA™ payment flows, MasterCard™ payment flows, PURE™ payment flows, American Express™ payment flows and/or any transaction flow. The payment engine 58 may use the security module 22 herein after the white box cryptography to restore the altered data and compute a cryptogram requested for the payment transactions.

Figure 6:
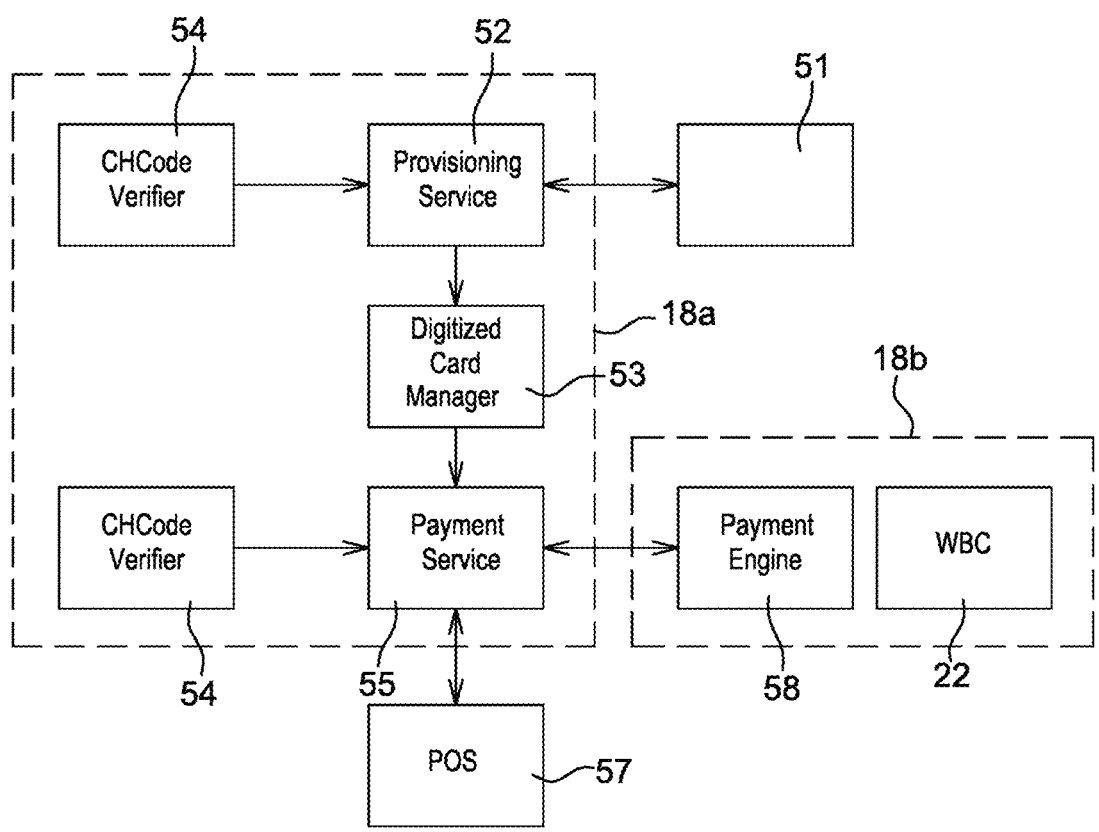
FIG. 6 illustrates, in an example of implementation, the different entities involved in a transaction through an emulated smart card.
Figure 7:
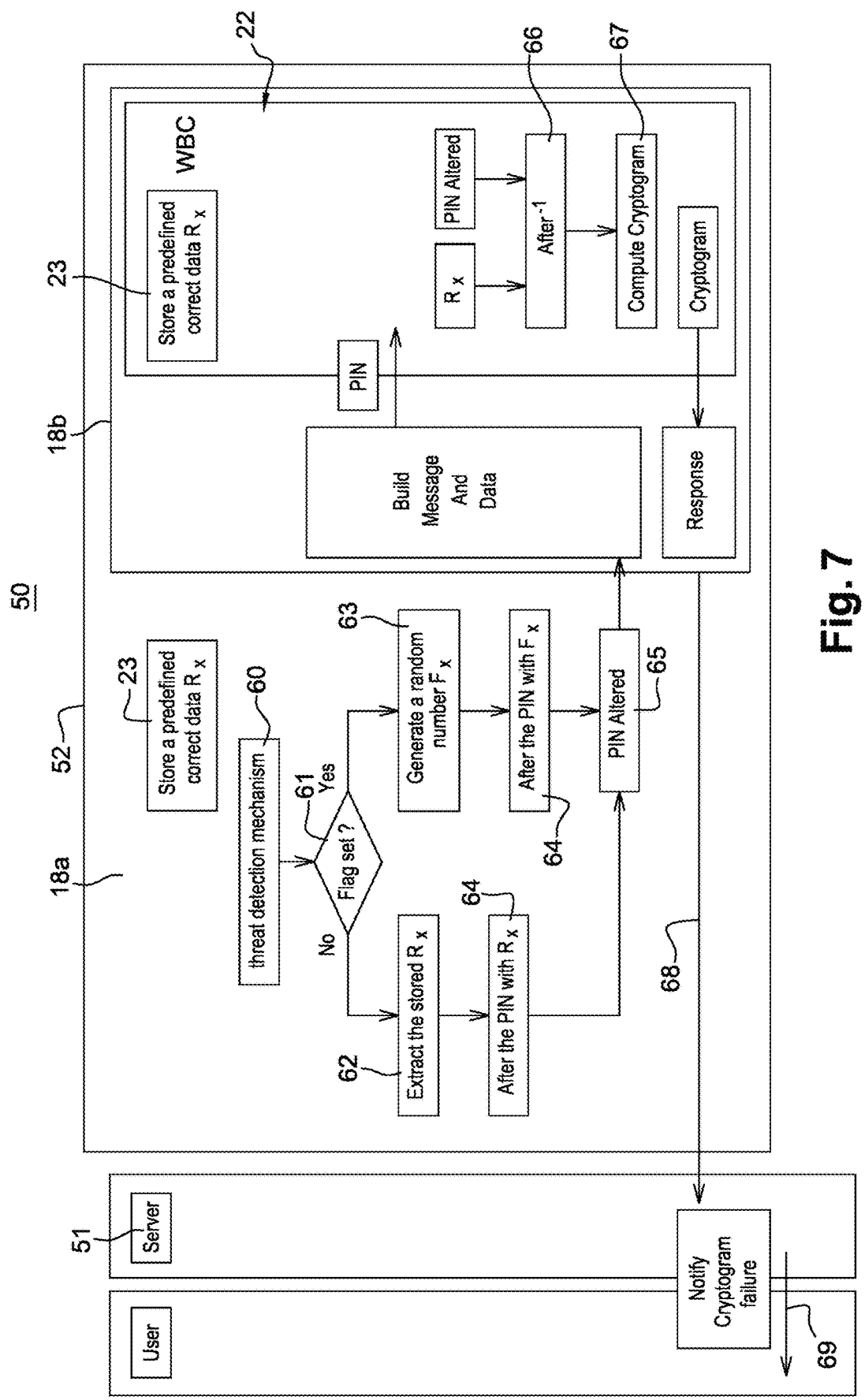
FIG. 7 is a logic flow diagram of an example of implementation of the present invention during the computation process of the cryptogram.

In the implementation detailed in FIG. 6 and FIG. 7, markers are inserted into the payment application. The following list show some examples of markers inserted into the payment application. At each marker [position] at least one detector agent is introduced.

Marker [0]: → Before Initialization of the SDK library.
Marker [1]: → Before starting to check and store Card Profile.
Marker [2]: → Before storing Tokenized Card ID and Default Card.
Marker [3]: → Before saving Card State.
Marker [4]: → Before loading Card Profile from Secure Storage.
Marker [5]: → Before synchronously loading Card State (for Payment).
Marker [6]: → Before loading Payment Credentials.
Marker [7]: → Before asynchronously loading Card State (for Card Status).
Marker [8]: → Before write operations (for everything).
Marker [9]: → Before Authentication.
Marker [10]: → Before sending PIN Change Command.
Marker [11]: → Before sending Pull Mode Replenishment Command.
Marker [12]: → Before sending Verify Activation Code Command.

This list of detection points has a counterpart of set of values of the mapping data 23 used to indicate a normal status, i.e. no threat detected. The set of values is hardcoded in both side of the processing unit 18*a* and the controlling unit 18*b*.

An example payment transaction using this implementation shown in FIG. 6 will now be described in FIG. 7. A user downloads the payment application onto the communication device 10. The payment application interfaces with a library that integrates the authorization framework/API described herein, allowing the user to securely purchase goods with, for example, credit cards that the user has registered with the digitized card manager 53.

Upon checkout in the payment application, the emulated ICC card is instantiated. The library can display to the user an interface that allows the user to select a preferred PIN-capable credit card for payment and, upon the user's selection, calls a transaction authorization function in the framework with the selected card as a parameter.

When the detection agents of the detection threat mechanism are executed, at step 60, in the marker positions, values are generated by the function RED(Sx). In step 61, If there is no threat detected by a detection agent, the function RED($S_x$), in step 62, extracts a value from the set of values associated to the detection agent. If a failure flag is set up by the detection agent, at step 63, the function RED($S_x$) generates a random false value and provide $F_x$ as a response. Each response of the function RED($S_x$) is put in a buffer.

After all the detection agents have been executed and the buffer has been updated with the results from the function RED($S_x$), the alteration mechanism is executed. The values provided by the function RED($S_x$) are used, at step 64, to alter the PIN entered by the user. The altered PIN is transmitted, at step 65, from the processing unit 18*a* to the controlling unit 18*b*. The payment engine 58, through the white box 59 restores, at step 66, the PIN knowing the original mapping data 23 of the set of values.

The payment engine 58, through the white box 59 computes a cryptogram at step 67. This cryptogram may be computed according to the EMV specifications published by EMVCo and available on EMVCo's web site. The cryptogram is transmitted, at step 68, to the remote system 51. This cryptogram is used by the remote system 51 to authenticate the card and hence authorize the transaction.

But if the at least one detection agent trigger a failure flag, i.e. a threat was detected, the PIN couldn't be restored and becomes actually a corruption. The cryptogram is wrongly computed. The remote system rejects the transaction and detect the threat. At step 69, the user can be notified of the failure. The user device can be blacklisted of performing transaction.

With the present invention, instead of using pure Boolean flags to trigger an action on a detection of an unauthorized use, it is proposed to use instead a pool of randomized data that are used to alter at least one data which will be verified by a remote system, typically sensitive data. Sensitive data is restored on the controlling unit of the application. Restoration becomes a corruption in the case a detection is triggered.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention.

The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

The invention claimed is:

1. A method for protecting a transaction performed between a communication device and a remote system against attacks against a transaction application executing on the communication device and aimed at discerning secret data of the communications device when conducting a transaction using the transaction application installed into the communication device, wherein the method hides detection of unauthorized use at the communication device, allows the transaction to proceed as if undetected, while informing the remote system of a detection of unauthorized use, the method comprising:

operating at least one detection agent at a marker position of a marker inserted into the transaction application according to a predefined protection scheme, each detection agent being configured to detect when the transaction application is in unauthorized use, wherein when an unauthorized use is detected by the detection agent, the at least one detection agent sets a failure flag associated with the detection agent, during runtime of the transaction application, testing the transaction application for detecting an unauthorized use by executing the at least one detection agent, if said detection agent finds an unauthorized use of the transaction application generating a false data associated with said detection agent, otherwise generating a right data associated with said detection agent, collecting the generated data from all said at least one detection agent, altering a transaction data with the generated collected data from all said at least one detection agent through an alteration mechanism in a reversible way wherein false data from at least one detection agent contributes to failure of the transaction, computing a transaction cryptogram from the altered transaction data wherein the transaction is authorized based on at least whether the computed transaction cryptogram is an expected transaction cryptogram, whereby if all detection agents generate a right data, the transaction cryptogram is valid and if at least one detection agents generate a false data, the transaction cryptogram is invalid;

transmitting the transaction cryptogram to a remote system; and upon receipt of the transaction cryptogram by the remote system, operating the remote system to reverse the alteration of the transaction data performed by the alteration mechanism, thereby verifying the transaction data and discerning any unauthorized use detected by the detection agents inserted at marker positions of the transaction application.

2. The method according to claim 1, wherein the computation of the transaction cryptogram comprises the following steps:
generating the right data,
restoring the transaction data with the generated right data through a reverse alteration mechanism,
computing the transaction cryptogram with the restored transaction data.

3. The method according to claim 1, wherein the detection agent is configured to:
set the failure flag to indicate that the transaction application is running under debugging mode,
set the failure flag to indicate that at least one operation of the transaction application has been tampered with, or
set the failure flag to indicate detection of a root level access of the transaction application.

4. The method according to claim 1, wherein a right data is generated for each detector agent, this right data corresponding to a no threat detected status.

5. The method according to claim 2, wherein the right data is generated during compilation time of the transaction application, this generated right data is stored in the alteration mechanism and in the reverse alteration mechanism.

6. The method according to claim 5, wherein the generated right data is stored as hardcoded data in the alteration mechanism and in the reverse alteration mechanism.

7. The method according to claim 2, wherein:
the alteration mechanism intersperse the right or the false data generated into the data stream of the transaction data,
the reverse alteration mechanism comprises an extraction mechanism that discards the interspersed data, if the interspersed data corresponds to its generated right data, otherwise the interspersed data is not discarded and the restored transaction data is returned as response is corrupted.

8. The method according claim 2, wherein the alteration mechanism and the reverse alteration mechanism is a XOR operation.

9. The method according to claim 1, wherein the computed cryptogram and a type of the detector agent having set up a failure flag indicating the kind of unauthorized use are sent by the communication device to a remote system.

10. The method according to claim 1, wherein a remote system authorizes or rejects the transaction based on a verification and validation of the cryptogram.

11. A communication device for performing a transaction with a remote system and protected against attacks against a transaction application executing on the communication device and aimed at discerning secret data of the communications device when conducting a transaction using the transaction application installed into the communication device, wherein the method hides detection of unauthorized use at the communication device, allows the transaction to proceed as if undetected, while informing the remote system of a detection of unauthorized use, the communication device comprising:
a processor; and
a memory coupled to the processor and storing a transaction application that performs operations for enhancing security of the communication device when conducting a transaction using the communication device according to a method including the steps:
during runtime of the transaction application, testing the transaction application for detecting an unauthorized use by executing at least one detection agent, each located at a designated marker position, each detection agent being configured to detect when the transaction application is in unauthorized use, wherein when an unauthorized use is detected by the detection agent, the at least one detection agent sets a failure flag associated with the detection agent, if said detection agent finds an unauthorized use of the transaction application generating a false data associated with said detection agent, otherwise generating a right data associated with said detection agent,
collecting the generated data from all said at least one detection agent,
altering a transaction data with the generated collected data from all said at least one detection agent through an alteration mechanism in a reversible way wherein false data from at least one detection agent contributes to failure of the transaction,
computing a transaction cryptogram from the altered transaction data wherein the transaction is authorized based on at least whether the computed transaction cryptogram is an expected transaction cryptogram, whereby if all detection agents generate a right data, the transaction cryptogram is valid and if at least one detection agents generate a false data, the transaction cryptogram is invalid;
transmitting the transaction cryptogram to a remote system; and
upon receipt of the transaction cryptogram by the remote system, operating the remote system to reverse the alteration of the transaction data performed by the alteration mechanism, thereby verifying the transaction data and discerning any unauthorized use detected by the detection agents inserted at marker positions of the transaction application.

12. A non-transitory computer memory comprising: instructions including a transaction application for enhancing security of a communication device when conducting transaction using the communication device, the transaction application having instructions to cause the communication devise to perform a method including:
wherein
the transaction application comprising a processing unit comprising a detection threat mechanism, said detection threat mechanism comprising at least one detection agent, each located at a marker position associated with the detection agent, each detection agent being configured to detect when the transaction application is in unauthorized use, wherein when an unauthorized use is detected by the detection agent, the at least one detection agent sets a failure flag associated with the detection agent,
the processing unit comprising a generator of data operable to generate a right data when no threat is detected by the detection threat mechanism and a false data when an unauthorized use is detected by each said at least one detection agent,
the processing unit comprising an alteration mechanism configured to alter a transaction data with the generated data in a reversible way, whereby if all detection agents generate a right data, a transaction cryptogram generated from the altered transaction data is valid and if at least one detection agents generate a false data, a transaction cryptogram generated from the altered transaction data is invalid,
the transaction application comprising a controlling unit, the controlling unit comprising a generator of right data,
the controlling unit comprising a reverse alteration mechanism configured to reconstruct the transaction from the transaction data altered by the processing unit and the right data generated by its generator,
the controlling unit comprising a security module configured to compute a cryptogram from the reconstructed transaction data, operating the controlling unit to reverse the alteration of the transaction data performed by the alteration mechanism, thereby verifying the transaction data and discerning any unauthorized use detected by the detection agents inserted at marker positions of the transaction application.

* * * * *